Patented Dec. 23, 1941

2,267,442

UNITED STATES PATENT OFFICE 2,267,442

METHOD OF PREPARING EDIBLE FOWL

William Richard Clark, Columbia, Mo., assignor of one-half to Thomas G. Clark, Columbia, Mo.

No Drawing. Application April 24, 1940,
Serial No. 331,381

1 Claim. (Cl. 17—45)

This invention relates to a method of preparing the meat of fowl so that steaks may be cut therefrom, and so far as I am aware, this has not been accomplished heretofore. In the past when it has been desired to fry chicken, turkey, etc., the fowl was dismembered and the various parts cooked separately. By my method the meat of a fowl is so integrated that steaks of any desired thickness may be cut therefrom and fried, broiled, or otherwise cooked, thus constituting an entirely new method of preparing fowl for the table.

While it is to be understood that my method is applicable to any kind of edible fowl, for the purpose of this specification I will describe it as applied to turkey.

My method is as follows: After being dressed in the usual manner, the turkey is dismembered, the bones and tendons are removed from the legs, and the meat is removed from the body portion by slitting it along the center of the breast bone and peeling both sides back off the bone. The skin is left on the meat of both the body and legs.

When the meat of each side is removed from the breast bone, it is tightly rolled, with the skin on the outside, and securely fastened in this rolled condition with string, wire, or any suitable means. When the bones and tendons have been removed from the legs, this meat also is rolled, with the skin on the outside, and securely tied in the same manner, each leg and each side of the body making a separate bundle. As has been said before, the separate bundles of meat have been rolled with the skin on the outside, which prevents drying and hardening of the meat, and said bundles are now ready to be placed in a refrigerator and kept until such time as it is desired to cut the steaks.

When the meat is placed in the hands of the meat cutter, he first unrolls a bundle of the turkey meat and cuts it, across the grain, into strips, and it has been my experience that the best results are obtained when such strips are cut about two inches wide. It is important that the meat be cut across the grain, as this prevents hardness and stringiness in cooking. When a strip has been cut, the meat cutter turns it up on the cutting block so that the cut surface, or end of the grain, contacts the block and rests thereon, and with any suitable tool he then beats down on the upper, exposed, cut end until the meat is flattened out to form a steak of the desired thickness. This beating of the cut cross grain ends of the meat has the effect of closing the pores, thus sealing the moisture into the meat and greatly increasing its tenderness and palatability. The steak is now ready for frying, broiling, or cooking in any desired manner.

The above described method not only results in an entirely novel method of preparing fowl for the table, but also greatly enhances the palatability thereof and creates a hitherto unknown table delicacy.

I claim:

A method of preparing meat of fowl for frying, which comprises the steps of dressing the fowl, cleaning the skin surface thereof, cutting slit formations therein, removing unedible bones, tendons, and other material beneath the skin thereof, turning the remaining meat and skin about parts thereof to form a roll with substantially the greater portion of the skin on the outer side thereof, retaining the roll in said form for a limited time, reshaping the roll and cutting the same substantially across the grain of the meat to provide strips of meat, supporting said strips so that the cut ends of the grain on one side are underneath, and pounding said strips in their last-named condition on the opposite, exposed, cut ends of the grain to form a thin, flattened piece of meat.

WILLIAM RICHARD CLARK.